(12) United States Patent
Chang et al.

(10) Patent No.: US 8,522,058 B2
(45) Date of Patent: Aug. 27, 2013

(54) COMPUTER SYSTEM WITH POWER SOURCE CONTROL AND POWER SOURCE CONTROL METHOD

(75) Inventors: Chen-Yu Chang, Taipei County (TW); Chun-Chieh Chien, Tainan (TW); Wei Hao Chen, Taipei (TW); Ruei-Chang Hsu, Taipei County (TW); Tsung-Hai Hsu, Zhonghe (TW)

(73) Assignee: MSI Computer (SHENZHEN) Co., Ltd., Shenzhen, Guangdong Province (CN)

( * ) Notice: Subject to any disclaimer, the term of this patent is extended or adjusted under 35 U.S.C. 154(b) by 875 days.

(21) Appl. No.: 12/579,914

(22) Filed: Oct. 15, 2009

(65) Prior Publication Data
US 2010/0281276 A1 Nov. 4, 2010

(30) Foreign Application Priority Data
Apr. 29, 2009 (TW) .............................. 98114273 A

(51) Int. Cl.
*G06F 1/26* (2006.01)
*G06F 11/00* (2006.01)

(52) U.S. Cl.
USPC .............. 713/320; 713/310; 713/400; 714/24

(58) Field of Classification Search
USPC .................................................. 713/300–340
See application file for complete search history.

(56) References Cited

U.S. PATENT DOCUMENTS

| | | | | |
|---|---|---|---|---|
| 5,649,212 A | * | 7/1997 | Kawamura et al. | 713/324 |
| 5,884,087 A | * | 3/1999 | White et al. | 713/310 |
| 6,583,947 B1 | * | 6/2003 | Hakamata et al. | 360/69 |
| 7,007,141 B2 | * | 2/2006 | Li et al. | 711/162 |
| 7,035,972 B2 | * | 4/2006 | Guha et al. | 711/114 |
| 7,426,646 B2 | * | 9/2008 | Fujimoto | 713/300 |
| 7,698,584 B2 | * | 4/2010 | Dunstan et al. | 713/300 |
| 7,856,526 B2 | * | 12/2010 | Shibayama et al. | 711/112 |
| 8,001,343 B2 | * | 8/2011 | Kassai | 711/162 |
| 8,074,090 B2 | * | 12/2011 | Nakagawa et al. | 713/320 |
| 8,127,165 B2 | * | 2/2012 | Qi et al. | 713/324 |
| 8,135,507 B2 | * | 3/2012 | Okabe et al. | 180/272 |
| 8,161,317 B2 | * | 4/2012 | Ishii et al. | 714/5.1 |
| 8,176,346 B2 | * | 5/2012 | Kuroda et al. | 713/320 |
| 2008/0201593 A1 | * | 8/2008 | Hori et al. | 713/324 |
| 2009/0193178 A1 | * | 7/2009 | Warren et al. | 711/103 |
| 2010/0042798 A1 | * | 2/2010 | Gorobets | 711/170 |

* cited by examiner

*Primary Examiner* — Tim T Vo
*Assistant Examiner* — Trisha Vu
(74) *Attorney, Agent, or Firm* — Morris Manning & Martin LLP; Tim Tingkang Xia, Esq.

(57) ABSTRACT

A computer system with power source control and a power source control method are presented. The computer system at least includes a first storage unit and a second storage unit, and the first storage unit stores a system program required by the computer system in basic operation. A switch is disposed on a power supply path between a power supply module and the second storage unit, such that the power supply module provides an electric power for the second storage unit to operate through the switch. When the second storage unit is in an idle state, the switch is used to cut off the power supply to the second storage unit, so as to effectively reduce the power consumption of the computer system.

14 Claims, 12 Drawing Sheets

COMPUTER SYSTEM WITH POWER SOURCE CONTROL AND POWER SOURCE CONTROL METHOD

CROSS-REFERENCE TO RELATED APPLICATIONS

This non-provisional application claims priority under 35 U.S.C. §119(a) on Patent Application No(s). 098114273 filed in Taiwan, R.O.C. on Apr. 29, 2009, the entire contents of which are hereby incorporated by reference.

BACKGROUND OF THE INVENTION

1. Field of Invention

The present invention relates to a power source management technique, and more particularly to a computer system with power source control and a power source control method.

2. Related Art

With increasing progress in developing the mobile computing technology, various electronic products are continuously put forward and innovated. As these electronic products can help users handle various tasks in work, study, and life, for example, word processing, data analysis, Internet services, and multimedia entertainment services, they have become an important part in the life of the users.

However, the more powerful the function of an electronic product is, the more hardware equipment is required, such as a processing chipset, an externally inserted interface card, and a radio transmission device, thus relatively increasing the consumption of the power. Therefore, the power source management system is an important trend for the development of the current electronic products, especially for portable electronic devices such as personal digital assistants (PDAs), notebook computers, or mobile phones.

Though the portable electronic device is capable of being used with the movement of the user, which is very convenient, it is only powered by a built-in power supply device of its own, for example, a battery, when no other power supply device is externally attached thereto. Therefore, due to a limited power supply, the power saving techniques of the electronic device are rather important.

For example, a central processing unit (CPU) of an ordinary personal computer (PC) or notebook computer is capable of adjusting the power consumption of hardware components such as the CPU, hard disk (HD), display, or memory according to the setting of an advanced configuration and power interface (ACPI) based on the idle state of the user in the operating system (OS), so as to carry out a multi-level electric power adjustment, and enter a so-called power save mode or sleep state. The power source management executed by software is mainly performing manual settings in an OS such as Windows in accordance with the use habit of the user and according to the fact whether the power supply is sufficient or not. Therefore, this power saving technique is not only complex in setting, but also poor in efficiency.

SUMMARY OF THE INVENTION

Accordingly, the present invention is a computer system with power source control and a power source control method, so as to solve the problem in the prior art that the power source management executed by software is not only complex in setting but also poor in efficiency.

In order to achieve the above objective, a computer system with power source control comprising a first storage unit, a second storage unit, a processor, a power supply module, and a switch is provided.

The power supply module provides an electric power required by the first storage unit, the second storage unit, and the processor to operate.

The processor is electrically connected to the first storage unit and the second storage unit, for reading and executing a system program stored in the first storage unit after the computer system is booted, so as to enable the computer system to operate based on the system program.

The switch is disposed on a power supply path between the power supply module and the second storage unit.

When the processor accesses the second storage unit, the switch is turned on to conduct the power supply path between the power supply module and the second storage unit. When the processor does not access the second storage unit, the switch is turned off to cut off the power supply path between the power supply module and the second storage unit, so as to stop supplying power to the second storage unit.

Thereby, a peripheral input device is used to control the ON/OFF of the switch. Or, the processor or controller acquires a use state of the second storage unit through software, so as to control the ON/OFF of the switch.

The first storage unit and the second storage unit may be two independent storage devices or integrated into a single storage device. The first storage unit may be a solid state disk (SSD), and the second storage unit may be a rotational hard disk (HD), so as to further improve the performance of the computer system. Besides, the first storage unit adopting the SSD and the second storage unit adopting the rotational HD may be two independent storage devices or two storage spaces of the same storage device.

In addition, the first storage unit and the second storage unit of the computer system may assume two different storage slots.

A file allocation table (FAT) of the second storage unit may be disposed in the second storage unit or in the first storage unit. When the processor does not access the second storage unit, it is determined whether to turn off the switch or not according to an executing state of the FAT of the second storage unit.

A power source control method applied to a computer system is also provided. The power source control method comprises: providing the computer system with a plurality of storage units which at least comprise a first storage unit and a second storage unit; reading and executing a system program stored in the first storage unit, so as to enable the computer system to operate based on the system program; providing an electric power required by the second storage unit to operate via a switch; acknowledging a use state of the second storage unit; and turning on the switch when the second storage unit is in use; while turning off the switch to cut off the power supply to the second storage unit when the second storage unit is not accessed.

In view of the above, the computer system with power source control and the power source control method provided by the present invention enable the computer system to cut off the power supply to the storage unit via the switch so as to effectively reduce the power consumption when the storage unit is in an idle state (for example, files stored in the storage unit are not executed or read).

The above description of the content of the present invention and the following illustration of the embodiments are intended to demonstrate and explain the principle of the present invention and to provide further explanations of the claims of the present invention.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
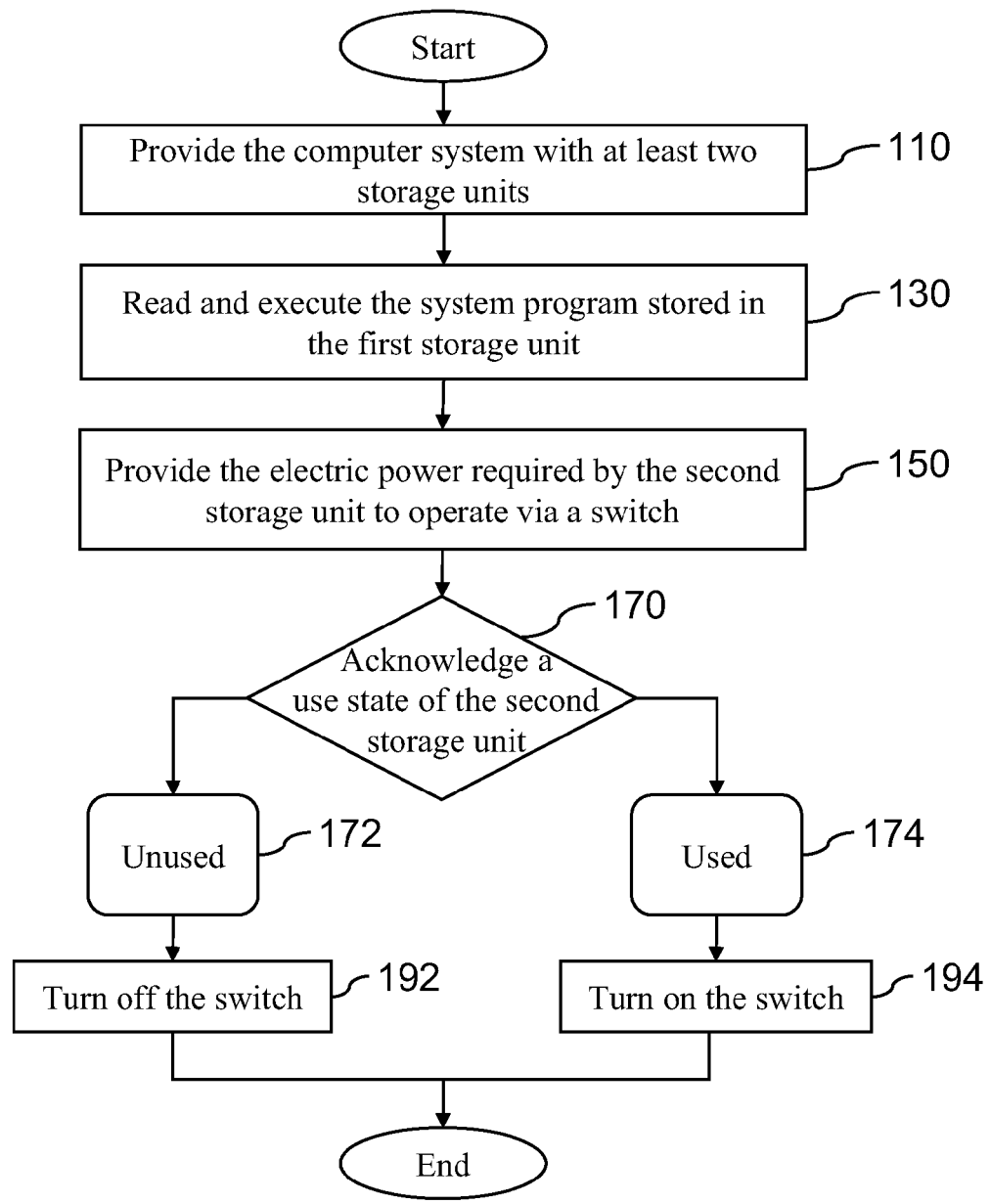
FIG. 1 is a flow chart of a power source control method according to a first embodiment of the present invention.

FIG. 1 is a power source control method according to an embodiment of the present invention. The power source control method is applied to a computer system 200, as shown in FIG. 2.

Figure 2:
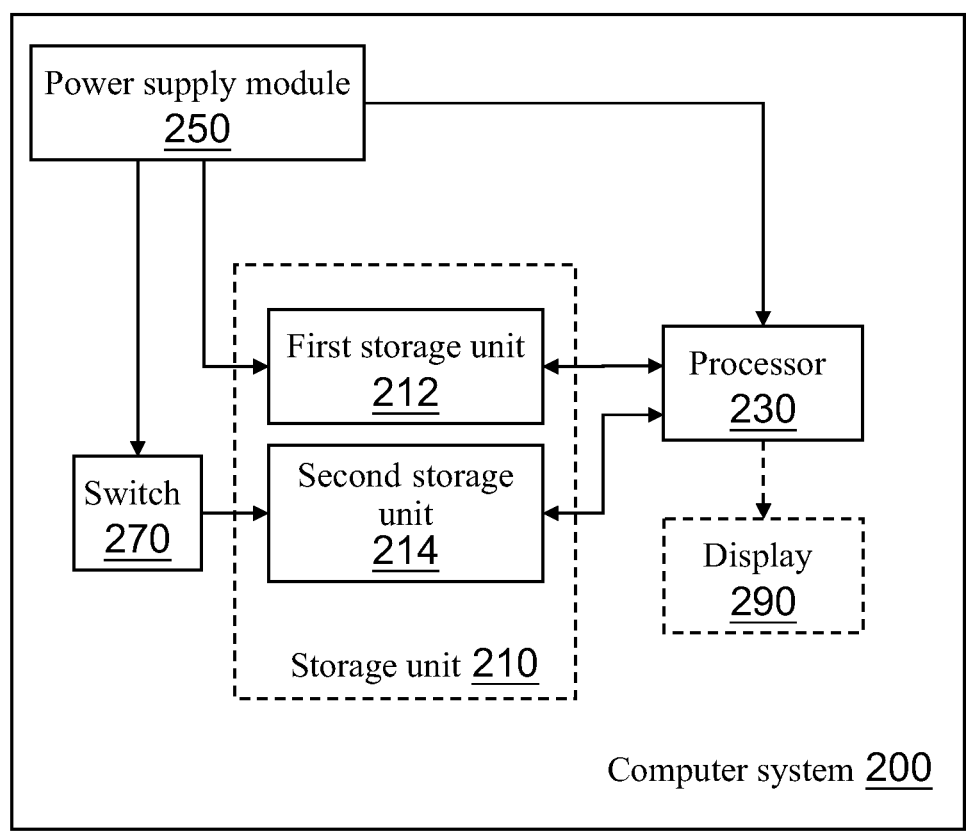
FIG. 2 is a schematic structural view of a computer system with power source control according to a first embodiment of the present invention.

Referring to FIGS. 1 and 2, the computer system 200 mainly comprises a storage unit 210, a processor 230, and a power supply module 250.

In this embodiment, the computer system 200 is provided with at least two storage units 210 (Step 110). To ease the illustration of the embodiment, two storage units 210, respectively a first storage unit 212 and a second storage unit 214, are taken as an example below.

The first storage unit 212 stores a system program required by the computer system 200 in basic operation. For example, a system program of an operating system (OS) such as Windows or Linux that the computer system 200 enters after being booted is stored in the first storage unit 212; and an application program (AP), for example, a resident program such as anti-virus program, executed after the computer system 200 is booted is also stored in the first storage unit 212. In other words, programs required by the computer system 200 in basic operation are stored in the first storage unit 212.

The second storage unit 214 is used for storing other data, such as document files, APs, and multimedia files.

The processor 230 is electrically connected to the first storage unit 212 and the second storage unit 214. After the computer system 200 is booted, the processor 230 reads and executes the system program stored in the first storage unit 212, so as to enable the computer system 200 to operate based on the system program (Step 130). For example, based on the system program, the processor 230 reads and executes other programs stored in the first storage unit 212, reads and edits document files stored in the second storage unit 214, reads and executes APs or multimedia files stored in the second storage unit 214, or stores files to the second storage unit 214.

Generally, the power supply module 250 is electrically connected to electronic components in the computer system 200, for example, the storage unit 210, the processor 230, and a display 290, so as to provide an electric power required by the components to operate.

In particular, the power supply module 250 provides the electric power required by the first storage unit 212, the second storage unit 214, and the processor 230 to operate via respective power supply paths.

For example, if the computer system 200 is an ordinary personal computer (PC), the power supply module 250 comprises a power supply device; and if the computer system 200 is a portable electronic device such as a personal digital assistant (PDA), a notebook computer, or a mobile phone, the power supply module 250 comprises a battery.

In this embodiment, a switch 270 is disposed on the power supply path between the power supply module 250 and the second storage unit 214, such that the power supply module 250 provides the electric power required by the second storage unit 214 to operate via the switch 270 (Step 150). The switch 270 is a hardware component, for example, an electronic component such as a transistor. In other words, in an embodiment, when the computer system 200 of the present invention is in a power save mode, the hardware switch is used to cut off the power supply to the hardware components in an idle state.

When the second storage unit 214 is unused (Step 172), i.e., the second storage unit 214 is not accessed (for example, data in the second storage unit 214 is not read, stored, or executed), the switch 270 is turned off (open) to cut off the power supply path between the power supply module 250 and the second storage unit 214 (Step 192), so as to stop supplying the electric power to the second storage unit 214. When the second storage unit 214 is in use (Step 174), i.e., the second storage unit 214 is accessed (for example, data in the second storage unit 214 is read, stored, or executed), the switch 270 is turned on (closed) to conduct the power supply path between the power supply module 250 and the second storage unit 214 (Step 194), so as to enable the power supply module 250 to provide the electric power to the second storage unit 214.

In other words, when the processor 230 accesses the second storage unit 214, for example, stores document files or multimedia files to the second storage unit 214, displays or edits document files stored in the second storage unit 214, plays multimedia files stored in the second storage unit 214, or reads and executes programs stored in the second storage unit 214, the switch 270 conducts the power supply path between the power supply module 250 and the second storage unit 214, so as to enable the power supply module 250 to provide the electric power required by the second storage unit 214 to operate. When the processor 230 does not access the data in the second storage unit 214, the switch 270 cuts off the power supply path between the power supply module 250 and the second storage unit 214, so as to stop supplying the electric power to the second storage unit 214. In this manner, the power consumption of the computer system 200 is effectively reduced.

The first storage unit 212 and the second storage unit 214 may be two independent storage devices or integrated into a single storage device. The first storage unit 212 may be an SSD, and the second storage unit 214 may be a rotational HD. That is, the SSD having a high reading speed is used to store the system program required by the computer system in basic operation, and the rotational HD having a high writing speed is used to store other unnecessary data, so as to further improve the performance of the computer system 200.

Besides, the first storage unit 212 adopting the SSD and the second storage unit 214 adopting the rotational HD may be two independent storage devices or two storage spaces of the same storage device.

In addition, the first storage unit 212 and the second storage unit 214 are two different storage slots, for example, a C-slot and a D-slot, in the OS of the computer system 200.

Further, an indicator diagram is shown on the display 290 of the computer system 200 to inform the user of the computer system 200 whether the second storage unit 214 is currently enabled (powered) or disabled (not powered).

The ON/OFF of the switch 270 on the power supply path between the power supply module 250 and the second storage unit 214 is enabled through hardware or software. Thereby, a peripheral hardware device (for example, a peripheral input device) of the computer system 200 is used to control the ON/OFF of the switch. Or, the processor 230 or controller of the computer system 200 acquires a use state of the second storage unit 214 through software, so as to control the ON/OFF of the switch 270.

Figure 3:
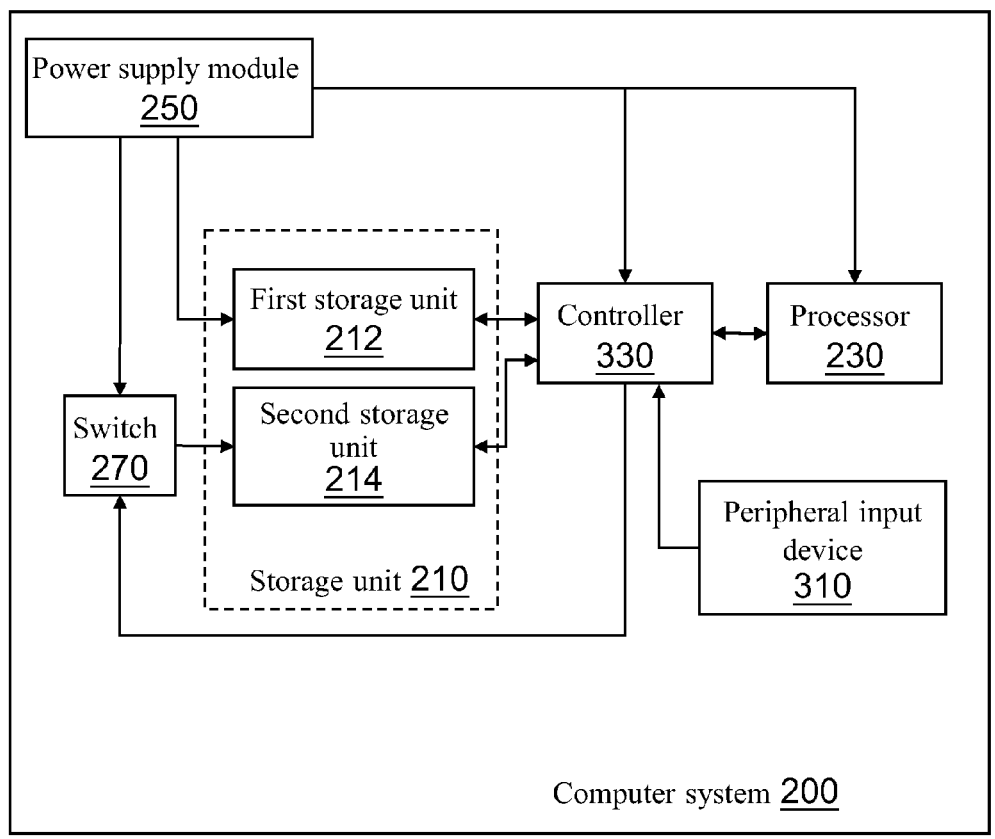
FIG. 3 is a schematic structural view of the computer system with power source control according to a second embodiment of the present invention.

As for the hardware, referring to FIG. 3, a control end of the switch 270 is electrically connected to a peripheral input device 310 (for example, a keyboard) of the computer system 200. Thereby, a hot key on the peripheral input device 310 is pressed to generate a switching signal, and the switch is turned on/off in response to the switching signal.

In particular, one or more keys on the peripheral input device 310 are set as the hot key for turning on/off the switch (for example, Key "Fn"+Key "F10"). When the user presses the keys "Fn" and "F10" at the same time, the peripheral input device 310 generates a switching signal to enable the ON/OFF of the switch.

Further, the peripheral input device 310 is connected to the control end of the switch 270 via a controller 330. When the peripheral input device 310 generates a switching signal, the controller 330 receives the switching signal and controls the ON/OFF of the switch 270 in response to the switching signal, so as to turn the switch 270 from an ON state to an OFF state or from an OFF state to an ON state.

Figure 4:
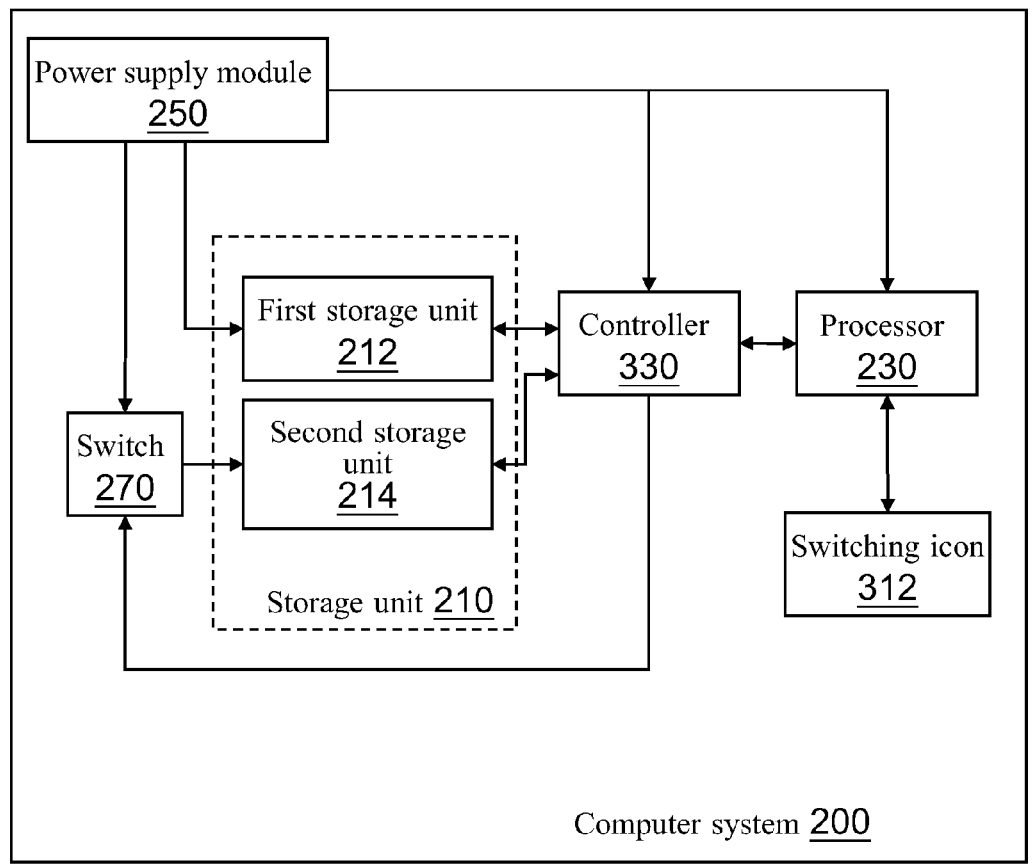
FIG. 4 is a schematic structural view of the computer system with power source control according to a third embodiment of the present invention.

As for the software, referring to FIG. 4, the control end of the switch 270 is coupled to a switching icon 312 on a display frame of the computer system 200. Thereby, the switching icon 312 is enabled to generate a switching signal, and the switch 270 is turned on/off in response to the switching signal.

For example, the processor 230 of the computer system 200 executes an AP for turning on/off the switch 270, so as to show the switching icon 312 on the display (not shown) of the computer system 200. When the user clicks the switching icon 312 on the display frame with a mouse (not shown) (i.e., by manipulating the mouse), the processor 230 generates a switching signal to enable the ON/OFF of the switch 270.

Further, the switching icon 312 is connected to the control end of the switch 270 via a controller 330. In other words, the processor 230 is connected to the control end of the switch 270 via the controller 330. When the switching icon 312 is enabled to make the processor 230 generate a switching signal, the controller 330 receives the switching signal and controls the ON/OFF of the switch 270 in response to the switching signal, so as to turn the switch 270 from an ON state to an OFF state or from an OFF state to an ON state.

Figure 5:
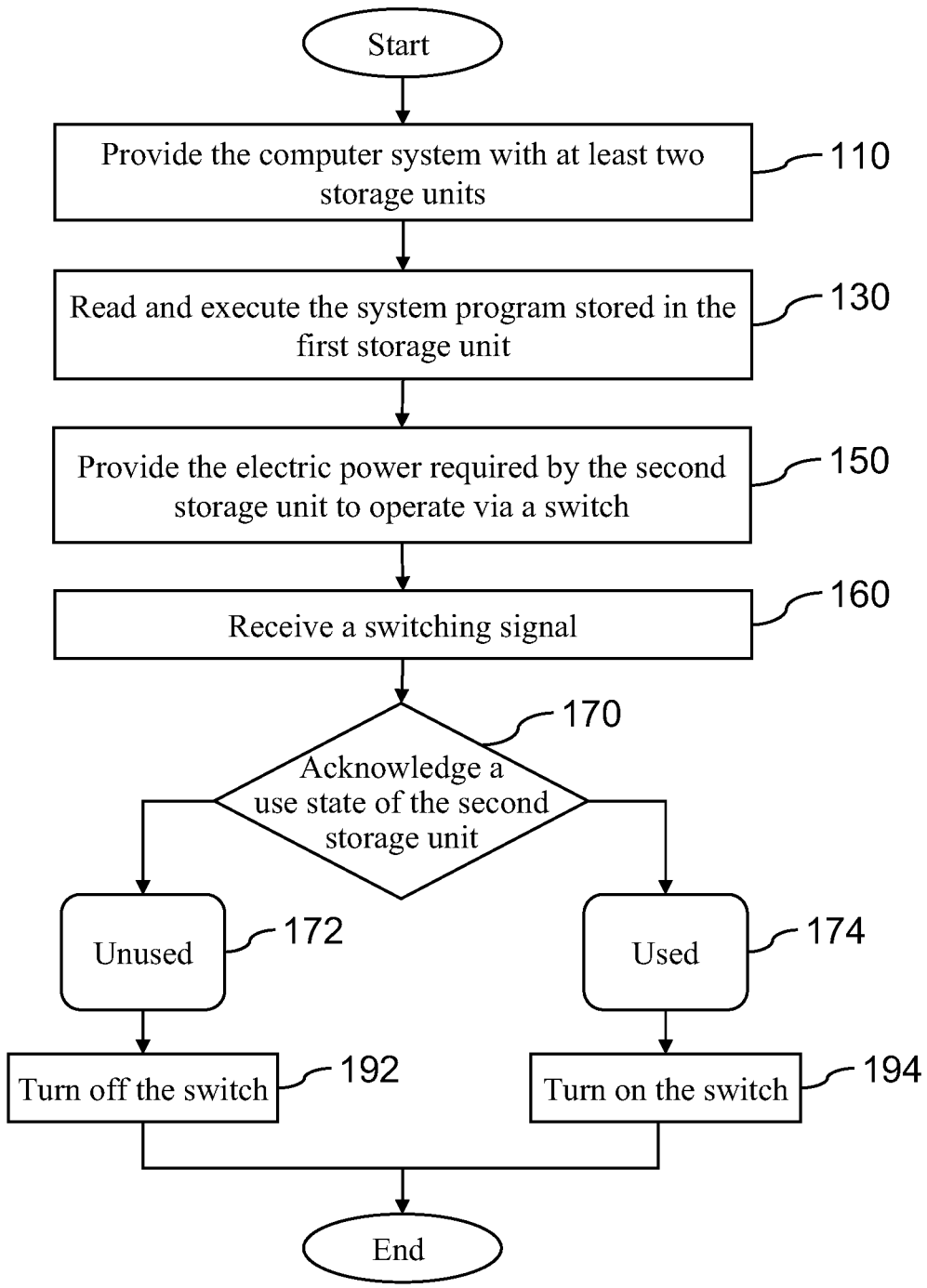
FIG. 5 is a flow chart of the power source control method according to a second embodiment of the present invention.

In addition, referring to FIG. 5, when the switch 270 is in an ON state, after receiving the switching signal (Step 160), the processor first detects an access state of the second storage unit 214 (Step 170), and then controls the ON (closed) or OFF (open) state of the switch according to the access state of the second storage unit (Step 192 or Step 194).

That is, when receiving the switching signal (Step 160), if the processor 230 accesses the second storage unit 214 (Step 174), the switching of the switch 270 is not implemented in response to the switching signal, i.e., the switch 270 may not be turned from an ON state to an OFF state. On the contrary, when receiving the switching signal (Step 160), if the processor 230 does not access the second storage unit 214 (Step 194), the switch 270 is turned from an ON state to an OFF state in response to the switching signal (Step 192).

Figure 6:
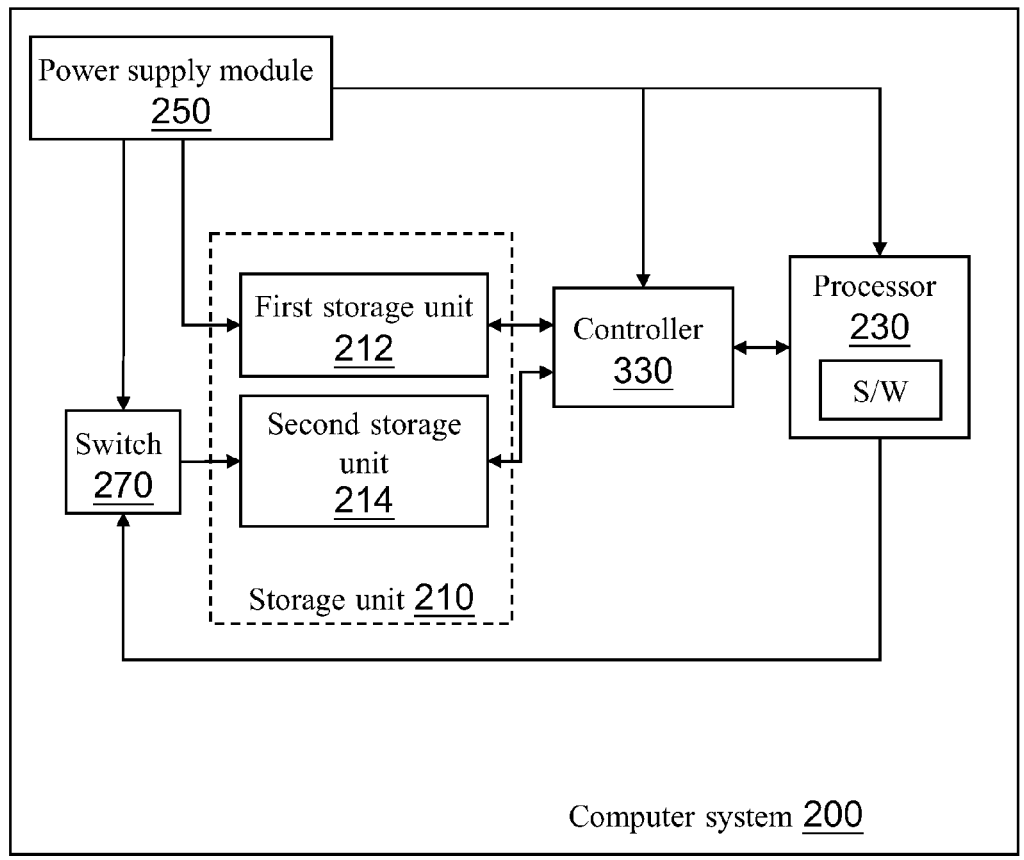
FIG. 6 is a schematic structural view of the computer system with power source control according to a fourth embodiment of the present invention.
Figure 7:
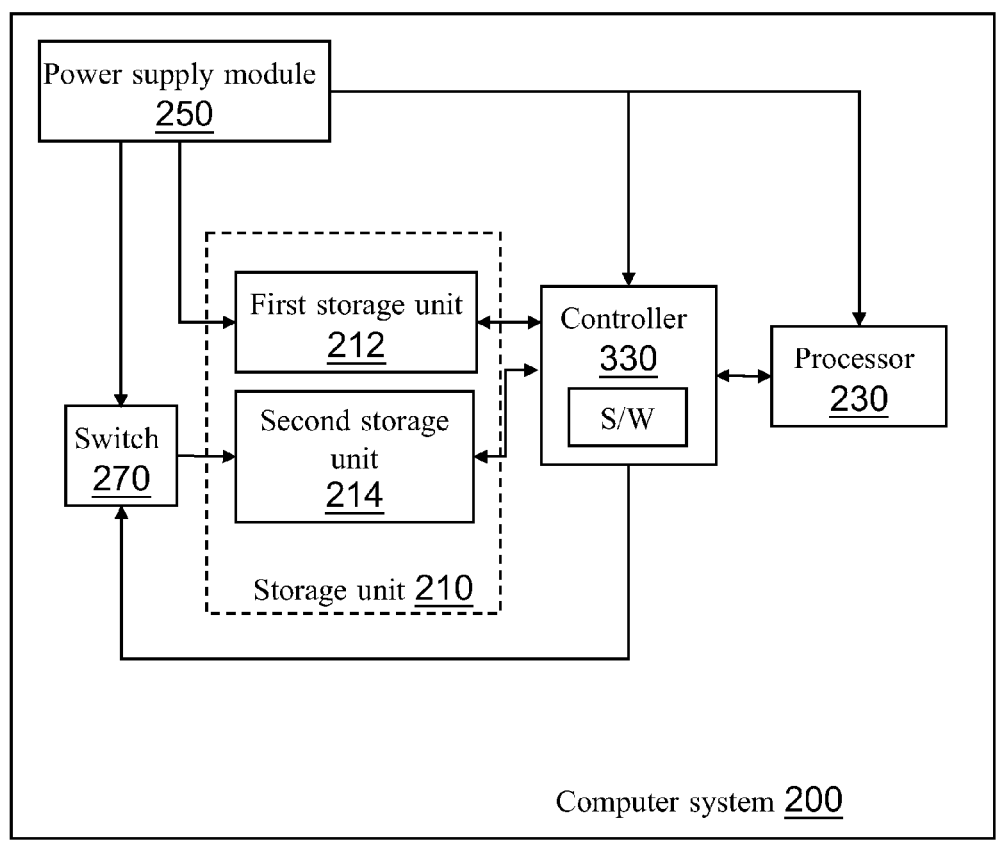
FIG. 7 is a schematic structural view of the computer system with power source control according to a fifth embodiment of the present invention.

As for the software, referring to FIGS. 6 and 7, the control end of the switch 270 is electrically connected to the controller 330 or the processor 230, such that the controller 330 or the processor 230 detects an access state of the second storage unit 214 through a software or firmware program S/W, thereby controlling the ON/OFF of the switch 270 according to the access state of the second storage unit 214.

For example, the controller 330 sends an acknowledgement (ACK) request to the processor 230, and requires the processor 230 to acknowledge the access state of the second storage unit 214. When acknowledging that the second storage unit 214 is not accessed, the processor 230 returns an ACK signal to the controller 330 to inform the controller 330 to turn off the switch.

Figure 8:
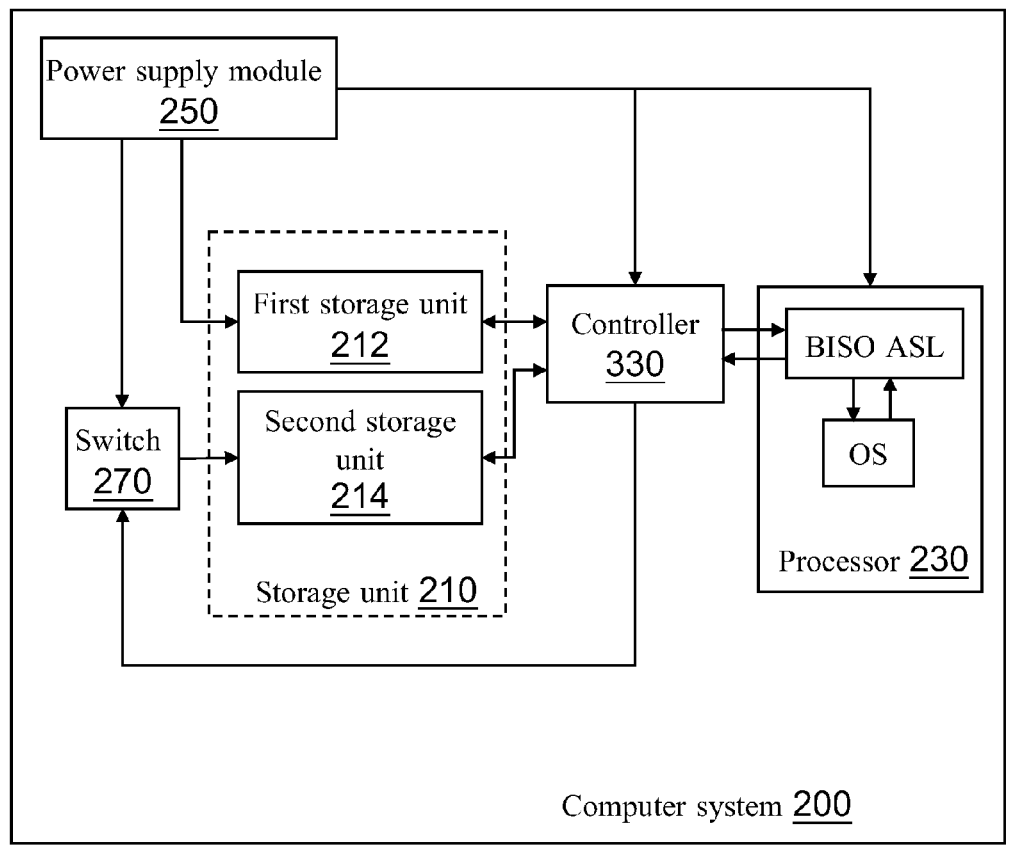
FIG. 8 is a schematic structural view of the computer system with power source control according to a sixth embodiment of the present invention.
Figure 9:
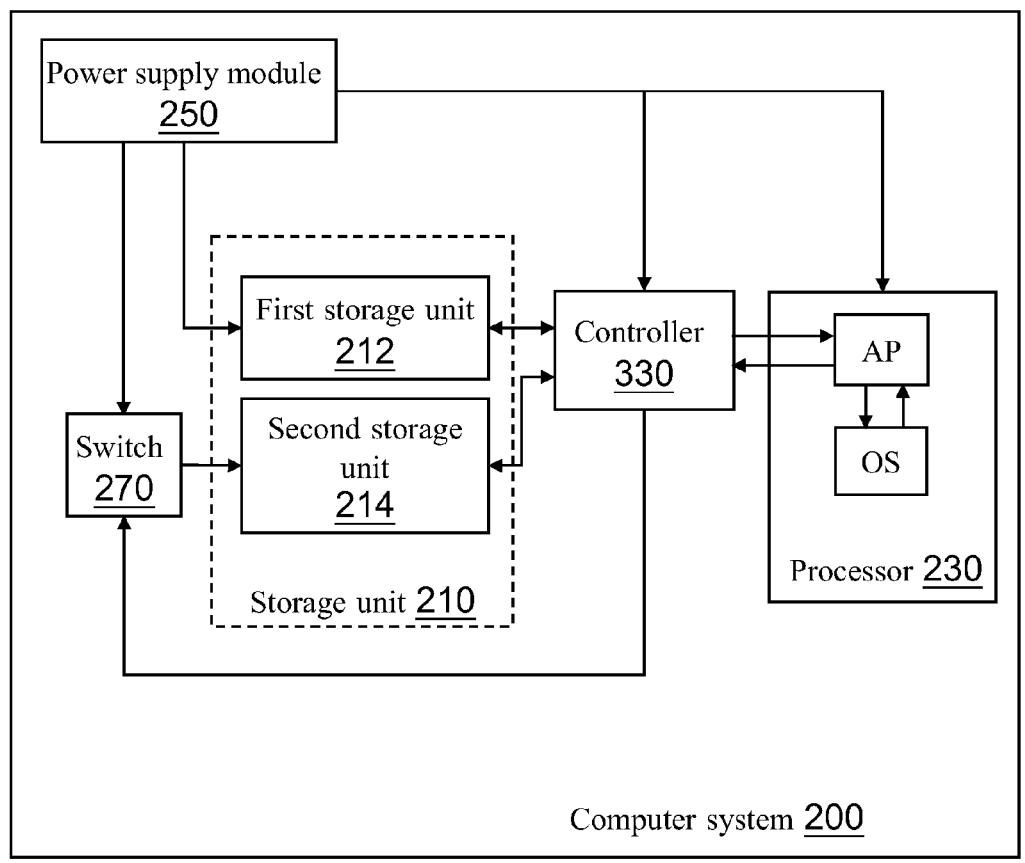
FIG. 9 is a schematic structural view of the computer system with power source control according to a seventh embodiment of the present invention.

Referring to FIGS. 8 and 9, when a basic input/output system ACPI source language code (BIOS ASL code) or an AP of the processor 230 receives an ACK request from the controller 330, the BIOS ASL code or AP queries the OS whether the second storage unit 214 is in use or not. Then, the OS acknowledges records in a register (not shown) to figure out whether the second storage unit 214 is in use or not. When the second storage unit is unused, the OS informs the BIOS ASL code or AP that the second storage unit 214 is unused, and the BIOS ASL code or AP returns an ACK signal to the controller to inform the controller 330 to turn off the switch 270.

The controller 330 may be an HD controller for controlling the access of the storage unit 210. In other words, the ON/OFF of the switch 270 and the access of the storage unit 210 can be controlled by the same one controller 330 or by two independent controllers 330.

In addition, when the processor 230 does not access the second storage unit 214, before turning off (opening) the switch 270 to cut off the power supply path between the power supply module 250 and the second storage unit 214, the processor 230 detects a browsing state of the file allocation of the second storage unit 214.

The computer system 200 is provided with a file allocation table (FAT) corresponding to the file allocation of the second storage unit 214. Therefore, when the processor 230 executes the FAT of the second storage unit 214, the file allocation of the second storage unit 214 is shown on the display 290, so as to enable the user to browse a directory structure in the second storage unit 214 and information related to files stored in the second storage unit 214 (for example, name, type, and size).

In other words, when the processor 230 does not access the second storage unit 214, it is determined whether to cut off the switch or not according to an executing state of the FAT of the second storage unit 214.

Generally, the FAT of the second storage unit 214 is disposed in the second storage unit 214.

When the processor 230 does not access the second storage unit 214, the processor 230 first detects an executing state of the FAT of the second storage unit 214 stored in the second storage unit 214. When the processor 230 does not execute the FAT of the second storage unit 214, the switch 270 is turned off (open) to stop supplying power to the second storage unit 214. On the contrary, when the processor 230 executes the FAT of the second storage unit 214, the switch 270 is not turned off, i.e., the switch 270 is remained in an ON state to continue supplying power to the second storage unit 214.

In this manner, a response delay is avoided when the user opens the directory of the files in browsing.

In an embodiment, the FAT of the second storage unit 214 is disposed in the first storage unit 212.

When the FAT of the second storage unit 214 is disposed in the first storage unit 212, if the user intends to browse the file allocation of the second storage unit 214, the processor 230 reads and executes the FAT of the second storage unit 214 in the first storage unit 212, so as to show a file allocation state of the second storage unit 214 on the display 290, i.e., a directory structure in the second storage unit 214 and information related to files stored in the second storage unit 214, thus enabling the user to browse the directory or files in the second storage unit 214.

Thereby, even if the directory or files in the second storage unit 214 is browsed when the second storage unit 214 is powered off (i.e., the switch is turned off), it is still unnecessary to turn on the switch 270 to provide power to the second storage unit 214, and the file allocation state of the second storage unit 214 may also be acquired, thereby further effectively reducing the power consumption of the computer system 200.

Referring to FIGS. 10A, 10B, 10C, and 10D, the power source control method of the present invention is applied to a computer system, so as to enable the computer system to execute a power saving program corresponding to the power source control method of the invention. Therefore, the computer system of the present invention adopts an SSD as its main storage unit, and adopts a rotational HD as its secondary storage unit. The main storage unit stores a system program required by the computer system in basic operation. The secondary storage unit stores other unnecessary data for the basic operation of the computer system, such as document files, multimedia files, unnecessary APs, and backup programs of an OS and/or AP.

Figure 10A:
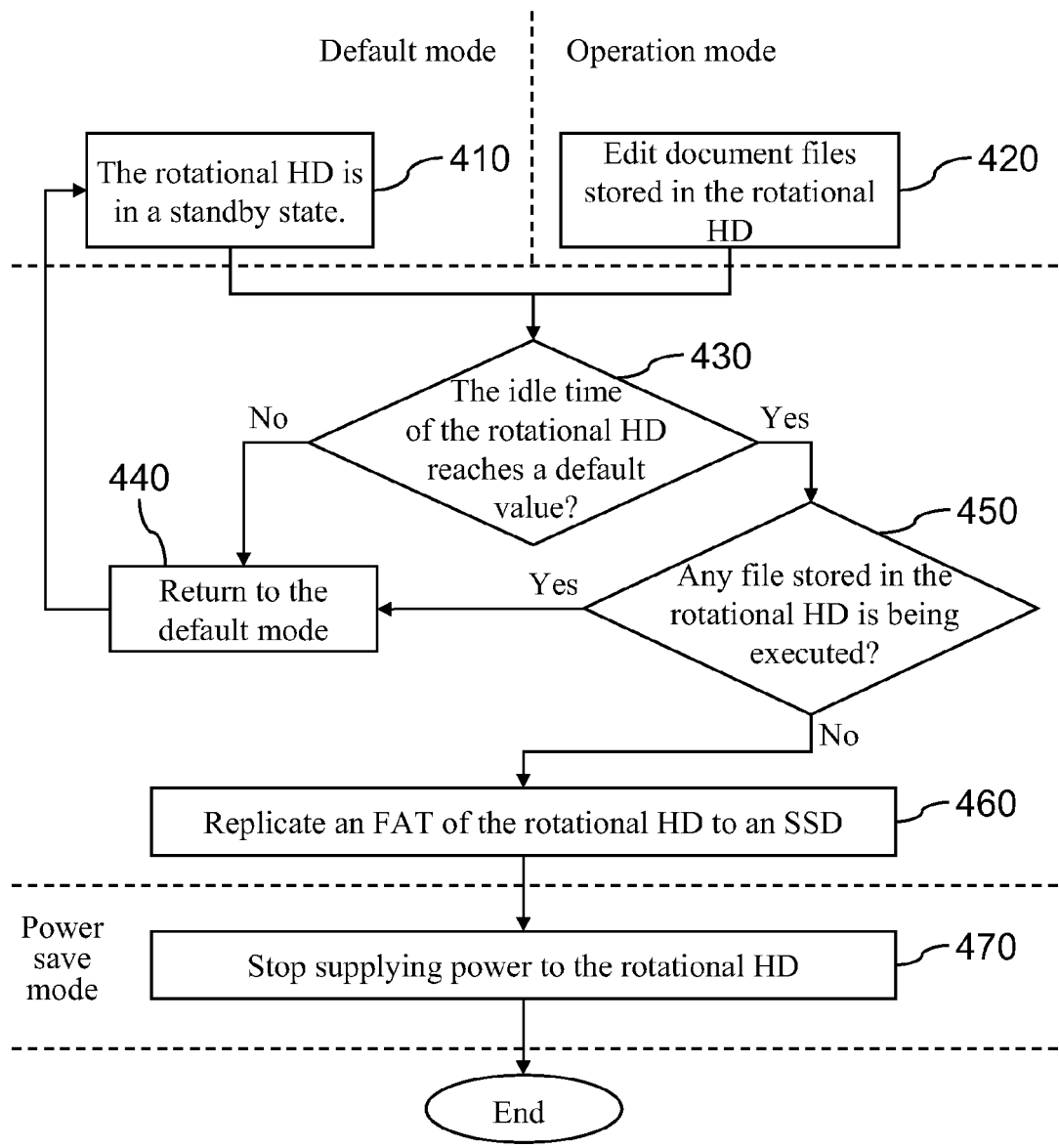
FIGS. 10A, 10B, 10C, and 10D are flow charts of a power saving program corresponding to the power source control method according to an embodiment of the present invention.

Referring to FIG. 10A, in a default mode, the rotational HD of the computer system is in a standby state (Step 410). At this point, the SSD enters a standby state or working state according to the operation condition of the computer system (not shown).

In an operation mode, the computer system normally provides power to the rotational HD, so as to edit document files (Step 420) and execute or access various files (not shown) stored in the rotational HD.

Moreover, the computer system may acknowledge an idle time of the rotational HD at any time, so as to determine whether to enter a power save mode of the rotational HD or not (Step 430).

If the rotational HD in an idle state does not reach a default time, i.e., the idle time of the rotational HD does not exceed a default value, the computer system returns to the default mode (Step 440), and the rotational HD is in a standby state.

If the rotational HD in an idle state reaches the default time, i.e., the idle time of the rotational HD reaches the default value, an executing state of each file in the rotational HD is first acknowledged (Step 450), i.e., it is acknowledged whether the computer system executes any file stored in the rotational HD.

When the computer system executes files stored in the rotational HD, the computer system returns to the default mode (Step 440), and the rotational HD is in a standby state.

When the computer system does not execute any file stored in the rotational HD, the computer system replicates the FAT of the rotational HD to the SSD (Step 460), and then enters a power save mode (Step 470).

In the power save mode, the computer system stops supplying power to the rotational HD, i.e., the rotational HD is in a hibernating state (Step 470).

Figure 10B:
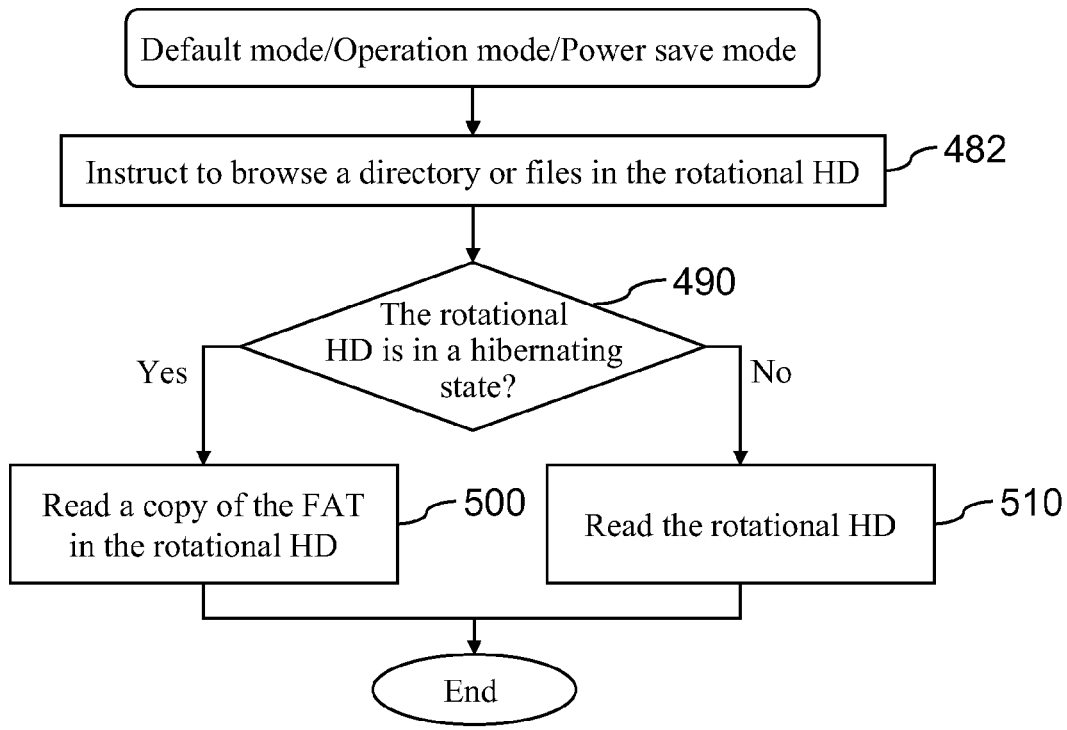

Further, referring to FIG. 10B, if the user intends to browse the directory or files in the rotational HD, i.e., the computer system receives an instruction to browse the directory or files in the rotational HD (Step 482), the computer system first acknowledges the state of the rotational HD, i.e., acknowledges whether the rotational HD is in a hibernating state (Step 490).

When the rotational HD is in a hibernating state, the computer system reads the copy of the FAT in the rotational HD (Step 500), i.e., reads the FAT of the rotational HD in the SSD.

When the rotational HD is not in a hibernating state, the computer system directly reads the rotational HD (Step 510), i.e., reads the FAT in the rotational HD.

Figure 10C:
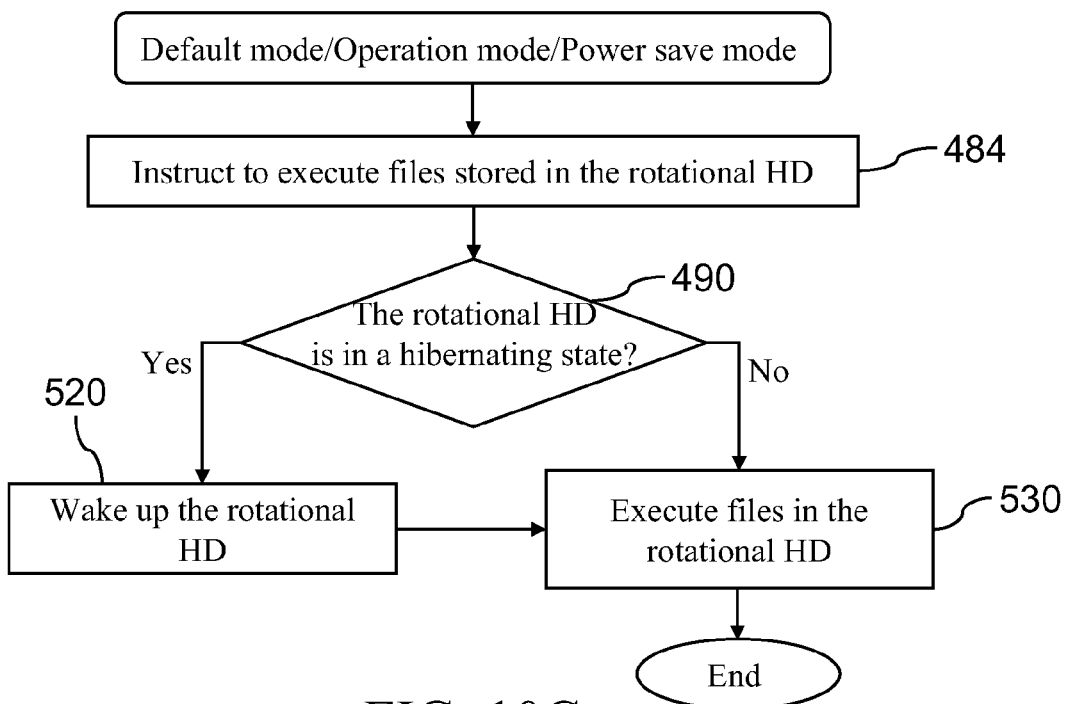

Referring to FIG. 10C, if the user intends to execute files stored in the rotational HD, i.e., the computer system receives an instruction to execute files stored in the rotational HD (Step 484), the computer system first acknowledges whether the rotational HD is in a hibernating state (Step 490).

When the rotational HD is in a hibernating state, the computer system wakes up the rotational HD (Step 520), and then executes files in the rotational HD (Step 530).

When the rotational HD is not in a hibernating state, the computer system directly executes files in the rotational HD (Step 530).

Figure 10D:
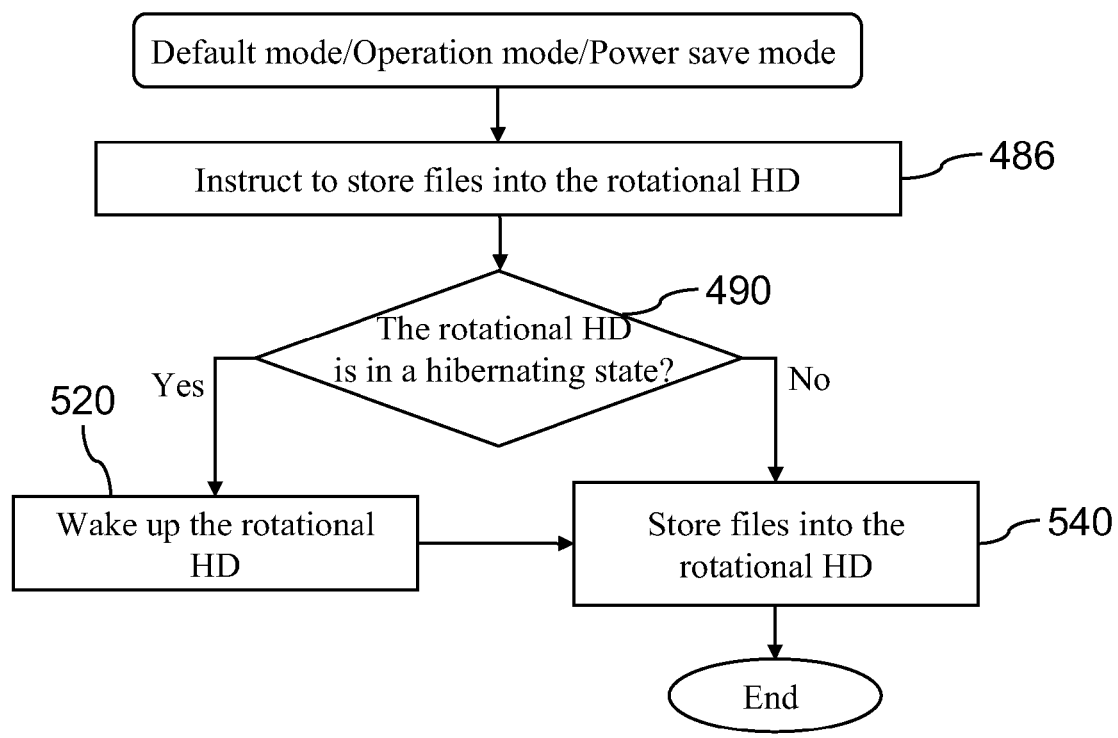

Referring to FIG. 10D, if the user intends to store files into the rotational HD, i.e., the computer system receives an instruction to store files into the rotational HD (Step 486), the computer system first acknowledges whether the rotational HD is in a hibernating state (Step 490).

When the rotational HD is in a hibernating state, the computer system wakes up the rotational HD (Step 520), and then stores files into the rotational HD (Step 540).

When the rotational HD is not in a hibernating state, the computer system directly stores files into the rotational HD (Step 540).

For example, the present invention is applied to a notebook computer. The notebook computer has a first storage unit and a second storage unit, and a battery of six battery cells is used to provide power for the notebook computer to operate. A system program required by the notebook computer in basic operation is stored in the first storage unit. When the second storage unit is not accessed, a switch is used to cut off the power supply to the second storage unit, so as to prolong the service time of the battery for at least 28%.

In view of the above, according to the computer system with power source control and the power source control method of the present invention, the computer system is enabled to cut off the power supply to the storage unit via a switch when the storage unit is in an idle state (for example, files stored in the storage unit are not executed or read), thus effectively reducing the power consumption.

What is claimed is:

1. A computer system with power source control, comprising:

a first storage unit, for storing a system program;

a second storage unit for storing data;

a processor, electrically connected to the first storage unit and the second storage unit, for reading and executing the system program stored in the first storage unit, so as to enable the computer system with power source control to operate based on the system program;

a power supply module, for providing an electric power required by the first storage unit, the second storage unit, and the processor to operate;

a switch, disposed on a power supply path between the power supply module and the second storage unit and electrically connected to the processor, for conducting or cutting off the power supply path, wherein the switch cuts off the power supply path when the second storage unit has not been accessed for a predetermined period of time; and a controller, electrically connected to the processor, for controlling the ON/OFF of the switch based on a switching signal, wherein the controller turns off the switch until the second storage unit has not been accessed for a predetermined period of time and a file allocation table (FAT) of the second storage unit has been replicated, even after receiving the switching signal for turning off the switch.

2. The computer system with power source control according to claim 1, wherein the first storage unit stores the file allocation table (FAT) of the second storage unit.

3. The computer system with power source control according to claim 1, wherein the first storage unit is a solid state disk (SSD), and the second storage unit is a rotational hard disk (HD).

4. The computer system with power source control according to claim 1, wherein the first storage unit and the second storage unit are integrated into a single storage device.

5. The computer system with power source control according to claim 1, wherein the first storage unit and the second storage unit are at different storage slots of the computer system.

6. A power source control method, applicable to a computer system, the method comprising:

providing the computer system with a plurality of storage units, wherein the storage units comprise a first storage unit and a second storage unit, and the first storage unit stores a system program;

reading and executing the system program stored in the first storage unit, so as to enable the computer system to operate based on the system program;

providing an electric power required by the second storage unit to operate via a switch;

receiving a switching signal from a peripheral input device of the computer system;

acknowledging a use state of the second storage unit; and turning off the switch when the received switching signal is for turning off the switch, the use state of the second storage unit indicates the second storage unit has not been accessed for a predetermined period of time, and a file allocation table (FAT) of the second storage unit is replicated to the first storage unit, so as to cut off the power supply to the second storage unit.

7. The power source control method according to claim 6, wherein the step of turning off the switch comprises: turning off the switch according to an executing state of the file allocation table (FAT) of the second storage unit stored in the second storage unit.

8. The power source control method according to claim 7, wherein the step of turning off the switch according to the executing state of the FAT of the second storage unit stored in the second storage unit comprises:

detecting the executing state of the FAT of the second storage unit stored in the second storage unit;

turning off the switch when the FAT is not executed; and remaining the switch in an ON state when the FAT is executed.

9. The power source control method according to claim 6, wherein the step of acknowledging the use state of the second storage unit comprises:

detecting an access state of the second storage unit; and determining the use state of the second storage unit according to the access state thereof.

10. The power source control method according to claim 6, further comprising:

storing the FAT of the second storage unit in the first storage unit.

11. The power source control method according to claim 10, further comprising:

reading the FAT of the second storage unit stored in the first storage unit; and displaying the FAT of the second storage unit according to the FAT of the second storage unit retrieved from the first storage unit.

12. The power source control method according to claim 6, wherein the first storage unit is a solid state disk (SSD), and the second storage unit is a rotational hard disk (HD).

13. The power source control method according to claim 6, wherein the first storage unit and the second storage unit are integrated into a single storage device.

14. The power source control method according to claim 6, wherein the first storage unit and the second storage unit are at different storage slots of the computer system.

* * * * *